Sept. 6, 1938.  A. G. H. VANDERPOEL  2,129,610
AUTOMATIC MEANS FOR CONTROLLING FLUID FLOW TO INTERNAL COMBUSTION ENGINES
Filed May 11, 1937  2 Sheets-Sheet 2

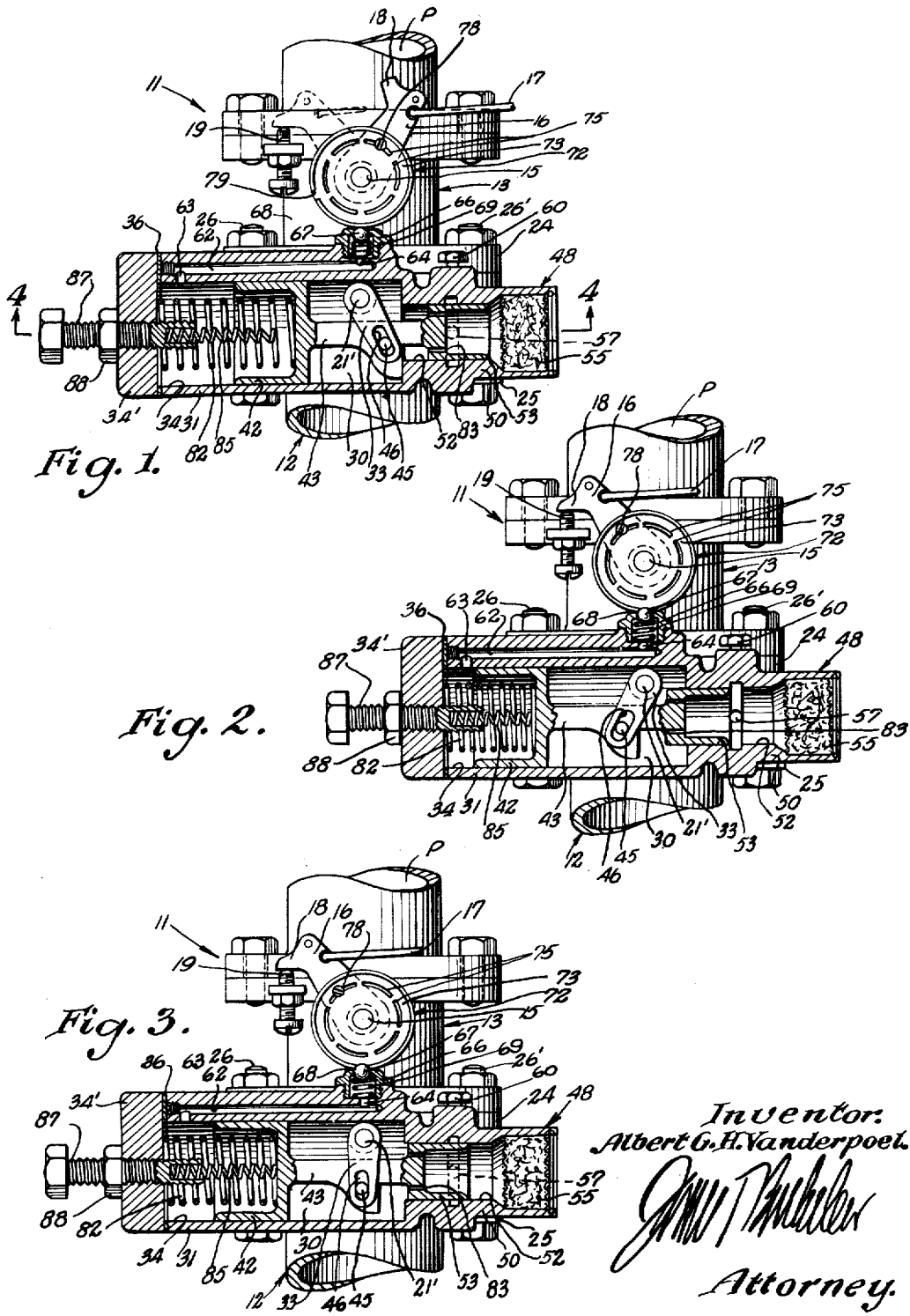

Inventor.
Albert G. H. Vanderpoel.

Attorney.

Patented Sept. 6, 1938

2,129,610

UNITED STATES PATENT OFFICE 2,129,610

AUTOMATIC MEANS FOR CONTROLLING FLUID FLOW TO INTERNAL COMBUSTION ENGINES

Albert G. H. Vanderpoel, Los Angeles, Calif., assignor of one-third to James O'Laverty and one-third to David E. Seward, both of Los Angeles, Calif.

Application May 11, 1937, Serial No. 141,998

13 Claims. (Cl. 123—103)

This invention has to do in a general way with carbureter systems for internal combustion engines, and is more particularly related to means for cutting off the fuel supply to the intake manifold, and at the same time admitting scavenging gas to the intake manifold during such times as the engine is running on momentum at above idling speed.

As is well known to those familiar with the art, the usual engine carbureter throttle valve is provided with a stop which holds the valve in partially open position when it has been released. In other words, it is customary to set the stop so that when the throttle valve is "closed", sufficient fuel mixture will pass the throttle valve through the suction passage of the carbureter and into the intake manifold to permit the proper operation of the engine at idling speed. Whenever the engine is running on momentum (with the throttle valve "closed") at above idling speed, such as when the engine is coasting down hill or when the accelerator is released at a time when the vehicle, for example, is travelling at a relatively high rate of speed, the restriction of the suction passage effected by the partial closure of the throttle valve, produces an abnormally high depression in the intake manifold which draws raw fuel or an extremely rich fuel mixture into the combustion chambers of the engine. This mixture is so rich that complete combustion cannot take place, resulting in the formation of obnoxious gases and a substantial waste of fuel. The present invention contemplates means for eliminating this introduction of raw fuel into the combustion chambers of the engine whenever the engine is running on momentum at above idling speed, and in order to prevent back-firing in the muffler, it also contemplates the admission of a scavenging gas to remove all of the combustible fuel mixture from the combustion system and exhaust system of the engine during its operation on momentum at above idling speed, which has been termed deceleration of the engine.

The present invention may be considered as an improvement on the devices disclosed in my copending applications Serial No. 20,997, filed May 11, 1935, Serial No. 95,126, filed August 10, 1936, and Serial No. 107,643, filed October 26, 1936.

The devices of all of these copending applications, like that of the present application, contemplate the provision of an auxiliary valve in the suction passage between the usual throttle valve and the intake manifold, such auxiliary valve being associated with suction responsive means actuated by the depression of the intake manifold to effect complete closure of the auxiliary valve whenever the manifold depression is "abnormally high."

By an abnormally high manifold depression I have reference to those depressions in excess of normal idling depression which exist whenever the engine is operating on momentum at above idling speed with the throttle valve in idling position.

In the devices of my copending applications, the communication of any depression or suction to the suction responsive member was controlled through the medium of a pilot valve, which was also under the control of the manifold depression, and it is a primary object of this invention to provide an improved and simplified device which eliminates the necessity of using this pilot valve.

My present device contemplates the use of a suction responsive member which is in constant communication with the suction passage of the carbureter, and in which yieldable means, such as a secondary spring, is provided for partially opening the auxiliary valve as soon as the engine has decelerated to the point where normal idling depression prevails in the intake manifold.

The provision of such means is necessitated by the importance of permitting fuel mixture to be admitted to the intake manifold as soon as idling speed is reached, so that the engine will not stall.

In this latter connection, my invention contemplates a device in which the closure of the throttle valve is effected or controlled dually by the position of the throttle valve and the manifold depression, and the opening movement of the auxiliary valve is controlled either by manifold depression or throttle position. In other words, when the manifold depression has receded to normal idling depression, the auxiliary valve is partially opening by a secondary spring associated with the suction responsive member, or in the event it is desired to open the throttle and accelerate the engine before it has returned to normal idling speed, the opening movement of the throttle valve is effective to release the suction acting on the suction responsive member which permits complete opening of the auxiliary valve.

It is a further object of this invention to provide means for adjusting the yieldable member that controls the partial opening of the auxiliary valve.

The details in the construction of a preferred embodiment of my invention, together with other objects attending its production, will be best understood from the following description of the accompanying drawings, which are chosen for illustrative purposes only, and in which:

Fig. 4 is an inverted plan section taken in a plane represented by the line 4—4 of Fig. 1;

Fig. 5 is a sectional view taken on the line 5—5 of Fig. 4; and

Figure 1A:
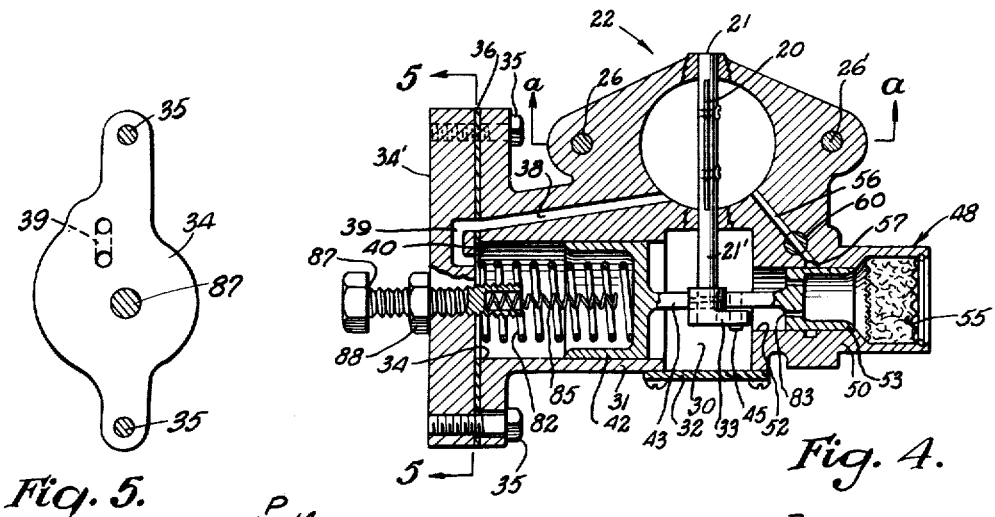
Fig. 1 is an elevation of a portion of a carbureter system with a preferred embodiment of my invention embodied therein, the view being partly in section to illustrate details in the construction of the device contemplated by this invention with the parts shown in the relative positions occupied when the throttle valve is open beyond its normal idling position.
Figure 1A:
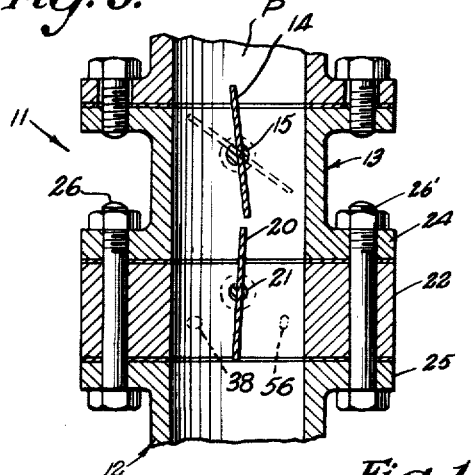
Figure 2A:
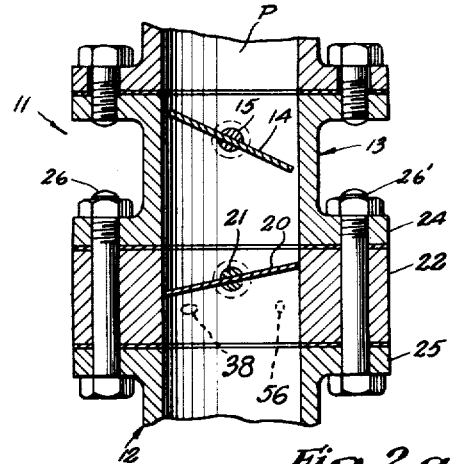
Fig. 2 is an elevation partly in section similar to Fig. 1 but illustrating the position of the parts of the device after the throttle valve has been retarded to normal idling position and during such time as the engine is operating at above normal idling speed.
Figure 3A:
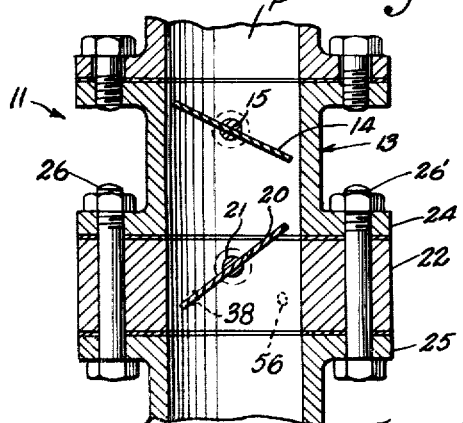
Fig. 3 is an elevation with parts in section similar to Figs. 1 and 2 but illustrating the position which the elements of the device occupy when the throttle valve is in normal idling position but after the engine has decelerated to normal idling speed.

Figs. 1a, 2a, and 3a are sectional elevations taken in a plane represented by the line a—a of Fig. 4 and illustrating the relative positions of the two valve members corresponding to the positions of the parts or elements of the device shown in Figs. 1, 2 and 3, respectively.

More particularly describing the invention as herein illustrated, reference numeral 11 indicates a portion of a carbureter, shown as being of the down-draft type. In this connection, it will be understood that the invention is adapted for use either in connection with an updraft or a down-draft carburetor, its purpose being to completely cut off the fuel admission section of the carbureter suction passage from the intake manifold, which is indicated in the drawings by reference numeral 12.

The carbureter is shown as being provided with a throttle valve body section generally indicated by reference numeral 13, such section being equipped with the usual butterfly-type throttle valve 14 (see Fig. 1a) which is mounted on a throttle valve shaft 15. The extending end of the throttle valve shaft is equipped with a throttle valve actuating lever of any suitable type indicated by reference numeral 16, such lever being attached to an actuating rod 17. The lever is shown as having a stop nose 18 adapted to engage an adjustable stop 19 mounted on the throttle valve body section, and this stop is adjusted so that when the throttle valve is retracted to normal idling position, it does not fully close the suction passage P, but occupies a position such as is illustrated in Figs. 2a and 3a, where it only partially restricts the suction passage so that sufficient fuel will pass through to permit the operation of the engine at normal idling speed.

Mounted in the suction passage between the throttle valve 14 and the intake manifold 12, I provide what may be termed an auxiliary valve, indicated by reference numeral 20. In the present form of my invention, this auxiliary valve is shown as being mounted on a shaft 21 which is carried in a block 22, shaped so as to be secured between flanges 24 and 25 on the throttle valve body and the intake manifold respectively, by means of bolts 26 and 26'.

The extending end 21' of the auxiliary valve shaft 21 is shown as projecting into an intermediate chamber 30 of a housing 31. This housing 31 may be formed integrally with or otherwise suitably attached to the block 22 which provides a portion of the carbureter suction passage, and the chamber 30 therein is shown as being provided with a cover member 32. The end portion 21' of the auxiliary valve shaft is provided with an arm or crank 33, which is utilized to actuate the auxiliary valve member 20.

As has previously been pointed out, it is one of the objects of this invention to provide means for actuating the auxiliary valve through the medium of the suction or depression in the intake manifold. This is accomplished by providing the housing 31 with a cylindrical bore generally indicated by reference numeral 34, which I may term a suction chamber or a suction cylinder. The end of this bore is closed by a cover member 34' secured to the housing through the medium of screws 35 and sealed in connection therewith through the medium of a gasket member 36.

The suction or depression of the intake manifold is communicated to the suction chamber 34 in this form of my invention through a duct or passage 38, shown as being formed in the block 22, such passage communicating with a return bend duct 39 in the cover member 34', which in turn has an inlet port 40 opening into the end of the suction chamber (see Fig. 4).

For the purpose of utilizing the suction or manifold depression thus communicated to the chamber 34 to actuate the valve shaft 21, I provide a piston or suction responsive member within the chamber or cylinder 34, such piston being indicated by reference numeral 42. Formed on or otherwise suitably attached to the piston 42 is a piston rod 43 which, as clearly illustrated in Figs. 1–3, inclusive, is equipped with a pin 45 received in a slot 46 on the crank or lever member 33. The arrangement of the parts is such that suction responsive movement of the piston 42 is effective to swing the shaft 21, and as a consequence the valve 20, from its open position as shown in Fig. 1a, to its fully closed position as illustrated in Fig. 2a.

It was previously pointed out as a further object of this invention to provide a device of the class described in which a scavenging gas, such as air or exhaust gas, was admitted to the intake manifold whenever the auxiliary valve was drawn to its fully closed position. In the present embodiment of my invention, this is accomplished through the medium of scavenging gas admission means generally indicated by reference numeral 48.

The means 48 is shown as comprising an extension 50 on the housing 31, which has a cylindrical bore 52 therein, such bore receiving a piston valve 53 which is mounted or otherwise secured to the end of the connecting rod 43 from the suction responsive piston 42. The end of the extension 50 is shown as being open and it may be filled with a suitable air filtering material indicated by reference numeral 55. A scavenging gas is admitted through this extension 50 into the suction passage of the intake manifold through a scavenging gas admission duct, generally indicated by reference numeral 56, which has an outlet port 57 in the suction passage between the auxiliary valve 20 and the intake manifold.

The inlet port 57 with this scanvenging gas admission duct 56 is situated in the wall of the bore 52 and is so positioned as to be normally covered by the piston valve member 53. In other words, the relative positions of the port 57 and the valve 53 are such that the port is covered by the valve except when the piston member 42 has been withdrawn by the action of manifold depression to the point where the auxiliary valve 20 is fully closed.

For the purpose of indicating the relative positions of the auxiliary valve 20 and the inner ends of passages 38 and 56, the latter are shown in dotted lines in Figs. 1a, 2a and 3a. As viewed in these figures, these passages lie at the inner side (see Fig. 4) of the suction passage P, hence the indication of passages 38 and 56 in dotted lines.

The amount of scavenging gas admitted through the duct 56 may be adjusted by means of an adjusting valve indicated at 60.

As has been previously indicated, my invention contemplates a device in which the auxiliary valve is always held in fully open position whenever the throttle valve is open beyond idling position and in which the auxiliary valve will be fully closed only during such times as the throttle valve is closed to idling position and the engine is operating at above idling speed. It will be seen that the suction chamber 34 is always in communication with the intake manifold so that the suction responsive member would normally be under the influence of the said manifold depression which prevails at any time during the operation of the engine. In order to prevent such suction from having any influence on the suction responsive member 42 when the throttle valve is open beyond idling position, I propose to vent the suction chamber to the atmosphere under these operating conditions. In other words, I provide a vent equipped with a valve which is open whenever the throttle valve is open, but which is automatically closed as soon as the throttle valve returns to idling position. In the present embodiment of my invention, such vent is formed by providing a vent duct 62 in the wall of the housing 31, such vent duct having an inlet port 63 opening into the suction chamber and an outlet port 64 opening through the top wall of the housing in a region below the position occupied by the throttle valve shaft 15. Mounted in threaded engagement with the housing above the port 64, I provide a valve seat member 66 which has check valve 67 therein adapted to seat in an opening 68 and to be held in engagement with its seat by means of a compression spring 69. The compression spring 69 is made of sufficient strength to hold the check valve 67 in sealing engagement with its seat against the action of any vacuum which may be applied in the suction chamber from the intake manifold. The arrangement of the check valve 67 and its associated opening is such that when the valve is closed a portion thereof extends upwardly through the opening in member 66 so as to be engaged by the peripheral (or other suitable cam surface) 72 on a plate 73, which is adjustably secured to the throttle valve actuating lever 16 in any suitable manner.

In the present form, the plate 73 is shown as comprising a disc having a central opening adapted to receive the end of the shaft 15 and provided with arcuate slots 75 adapted to receive a screw 78 whereby it may be attached to various types of throttle actuating levers.

The peripheral flange 72 is shown as having a broken away portion 79 situated so as to be positioned over the check valve 67 whenever the throttle valve is in idling position. In this way, when the throttle valve is returned to idling position the spring 69 raises the check valve 67 into engagement with the seat, and seals the suction chamber 34 so that the prevailing manifold depression may be effective to impart suction responsive movement to the piston 42.

In order to return the suction responsive piston 42 to a position where the auxiliary valve 20 is fully opened, during such times as the suction in the chamber is being relieved by the vent, I provide a spring 82 which is always in engagement with the piston 42. This spring 82, which I have termed the primary spring, is preferably a relatively weak or light weight spring so that it will return the piston to the position shown in Fig. 1 only against such conditions where atmospheric or substantially atmospheric pressures prevail in the suction chamber. In this latter connection, it will be observed that the portion of the bore 34 opposite the suction chamber is vented to the atmosphere, in the present form of my invention, through ports 83 in the piston valve 53.

From the description so far, it will be seen that when the engine is operating with the throttle valve in any open position beyond normal idling position, the suction chamber 34 is vented to the atmosphere and the spring 82 is effective to maintain the auxiliary valve 20 in its full open position as shown in Fig. 4. As soon as the throttle valve is retracted to normal idling position, the vent valve 67 closes and the suction of the intake manifold imparts movement to the piston or suction responsive member 42, such movement being effective to rotate the valve 20 in a closing direction.

As has previously been pointed out, it is important that the movement of the piston 42 be effective to fully close the valve only in the event the manifold depression communicated to the suction chamber is in excess of normal idling depression. In other words, it is not desirable to maintain the auxiliary valve 20 fully closed when the engine has decelerated to normal idling speed, and if the valve 20 has been fully closed while the engine is operating at above idling speed, it is desirable that such valve be at least partially opened as soon as the engine has decelerated to idling speed.

For the purpose of partially opening the auxiliary valve 20 when normal idling depression prevails within the intake manifold and during such times as the vent valve 67 is closed, I provide what may be termed a secondary spring within the suction chamber, such spring being indicated by reference numeral 85. It will be noted that this secondary spring is of substantially less length than the normal travel of the piston member and is adapted to be engaged by the piston member only as the piston approaches its auxiliary valve closing position. This spring is made of a strength such that it will expand and move the suction responsive piston 42 to partially open the auxiliary valve against the action of normal idling depression applied in the suction chamber 34, and to accommodate for various types of engines and carbureters I have shown the secondary spring 85 as being mounted in an adjustable screw support 87 which is equipped with a lock nut 88.

In this same connection it is important that the scavenging gas be cut off as soon as the auxiliary valve is partially opened to permit the engine operating at idling speed, and the length of the skirt on the piston valve 53 with relation to the position of the port 57 is such that this will take place.

Referring now to Figs. 1-3, inclusive, and Figs. 1a-3a, inclusive, for a description of the operation of the device, it will be seen that in Figs. 1 and 1a the throttle valve 14 has been moved to a position where it is opened beyond normal idling position. In these particular views the throttle valve is shown as being wide open, but it is to be understood that so far as the operation of the auxiliary valve is concerned this will be the same for any intermediate position between that shown in Figs. 1 and 1a and the normal idling position of the throttle valve. In Fig. 1 it will be observed that the vent valve 67 has been opened to relieve the suction from the suction chamber 34 so that the primary spring 82 is effected to force the suction piston 42 forwardly and fully open the auxiliary valve 20.

Assuming that the engine has been operating at above idling speed and the throttle valve is retarded to the position shown in Fig. 2, or that the engine is operating at about idling speed under any other circumstances with the throttle valve "closed", the first thing that occurs is the closure of the vent valve 67 which seals the suction chamber 34. The abnormally high manifold depression attending the closure of the throttle valve with the engine running on momentum, is effective to impart suction responsive movement to the piston 42 and draw the same back against the action of both the primary compression spring 82 and the secondary compression spring 85 to the position shown in Fig. 2 where the auxiliary valve is fully closed as clearly illustrated in Fig. 2a. Also, as has been previously pointed out and as is clearly shown in Fig. 2 this retractive movement of the suction responsive member is also effective to uncover the scavenging gas admission port 57 so that scavenging gas is delivered into the intake manifold.

In the event it is desired to accelerate the engine before it has returned to normal idling speed, the opening movement of the throttle valve is of course effective to open the vent 67 and the parts return to the position shown in Fig. 1 where the auxiliary valve is wide open.

In the event the engine is permitted to decelerate to normal idling speed on the other hand, as the normal idling depression becomes prevalent within the intake manifold, the secondary spring 85 is effective to advance the suction responsive member, against the action of such depression, to the position shown in Fig. 3 where the scavenging gas admission port is closed by the piston valve 53, and the auxiliary valve 20 is partially opened as illustrated in Fig. 3a.

From the foregoing description it will be seen that I have provided a device which is of simple form and construction and which may be readily adapted to various types of carbureters. It is to be understood that while I have herein described and illustrated one preferred form of my invention, the invention is not limited to the precise construction described above, but includes within its scope whatever changes fairly come within the spirit of the accompanying claims.

I claim:

1. In an engine provided with an intake manifold, and a carbureter system having a mixture outlet passage and a throttle valve therein, the combination of: an auxiliary valve in said passage; suction responsive means communicating with said passage and adapted for retractive movement by manifold depressions; means operable by retractive movement of said suction responsive means for closing said auxiliary valve; a primary spring adapted to open said auxiliary valve when the depression acting on said suction responsive means is less than normal idling depression; a secondary spring adapted to partially open said auxiliary valve against the action of normal idling depression, the combined strengths of said springs being such as to permit full closure of said auxiliary valve by manifold depressions in excess of normal idling depression, means for actuating said throttle valve; and means controlled by said throttle actuating means for relieving the suction in said suction responsive means.

2. In an engine provided with an intake manifold, and a carbureter system having a mixture outlet passage and a throttle valve therein, the combination of: an auxiliary valve in said passage; suction responsive means communicating with said passage and adapted for retractive movement by manifold depressions; means operable by retractive movement of said suction responsive means for closing said auxiliary valve; a primary spring adapted to open said auxiliary valve when the depression acting on said suction responsive means is less than normal idling depression; a secondary spring adapted to partially open said auxiliary valve against the action of normal idling depression, the combined strengths of said springs being such as to permit full closure of said auxiliary valve by manifold depressions in excess of normal idling depression, a vent associated with said suction responsive means; and means operable with said throttle valve for opening said vent when the throttle valve is opened and closing said vent when the throttle valve is in idling position.

3. In an engine provided with an intake manifold, and a carbureter system having a mixture outlet passage and a throttle valve therein, the combination of: an auxiliary valve in said passage; suction responsive means communicating with said passage and adapted for retractive movement by manifold depressions; means operable by retractive movement of said suction responsive means for closing said auxiliary valve; a primary spring adapted to open said auxiliary valve when the depression acting on said suction responsive means is less than normal idling depression; a secondary spring adapted to partially open said auxiliary valve against the action of normal idling depression, the combined strengths of said springs being such as to permit full closure of said auxiliary valve by manifold depressions in excess of normal idling depression, and means including a valve operable by said suction responsive member for admitting scavenging gas to the intake manifold beyond the auxiliary valve in the direction of air flow when said auxiliary valve is fully closed.

4. In an engine provided with an intake manifold, and a carbureter system having a mixture control passage and a throttle valve therein, the combination of: an auxiliary valve in said passage; suction responsive means communicating with said passage and adapted for retractive movement by manifold depressions; means operable by retractive movement of said suction responsive means for closing said auxiliary valve; a primary spring adapted to open said auxiliary valve when the depression acting on said suction responsive means is less than normal idling depression; a secondary spring adapted to partially open said auxiliary valve against the action of normal idling depression, the combined strengths of said springs being such as to permit full closure of said auxiliary valve by manifold depressions in excess of normal idling depression, and means including a valve operable by said suction responsive member for admitting scavenging gas to the intake manifold beyond the auxiliary valve in the direction of air flow when said auxiliary valve is fully closed, said scavenging gas valve being arranged so as to be fully closed by the action of said secondary spring.

5. In combination with the mixture outlet passage of a carbureter having a throttle valve: an auxiliary valve in said passage; a suction cylinder communicating with said passage; a piston in said suction cylinder; means operable by suction responsive movement of said piston for closing said auxiliary valve; a weak spring continuously engaging said piston and adapted to fully open said auxiliary valve when the suction in said cylinder is relieved; a strong spring in said cylinder adapted to engage said piston near the end of its valve closing movement for partially opening said valve when the suction in said cylinder is partially relieved, and means operated with the throttle valve for relieving the suction in said suction cylinder.

6. In combination with the mixture outlet passage of a carbureter having a throttle valve: an auxiliary valve in said passage; a suction cylinder communicating with said passage; a piston in said suction cylinder; means operable by suction responsive movement of said piston for closing said auxiliary valve; a weak spring continuously engaging said piston and adapted to fully open said auxiliary valve when the suction in said cylinder is relieved; a strong spring in said cylinder adapted to engage said piston near the end of its valve closing movement for partially opening said valve when the suction in said cylinder is partially relieved, a vent in said suction cylinder; and means operated with said throttle valve for opening said vent when said throttle valve is opened and closing said vent when said throttle valve is in idling position.

7. In combination with the mixture outlet passage of a carbureter having a throttle valve: an auxiliary valve in said passage; a suction cylinder communicating with said passage; a piston in said suction cylinder; means operable by suction responsive movement of said piston for closing said auxiliary valve and for admitting scavenging gas to the mixture outlet passage beyond the valve in the direction of air flow; a weak spring continuously engaging said piston and biasing same toward a valve opening position; and a strong spring in said cylinder adapted to resist movement of said piston near the end of its valve closing movement for partially opening said valve when the suction in said cylinder is partially relieved, said suction responsive movement of the piston normally being unopposed by said strong spring.

8. In combination with the mixture outlet passage of a carbureter having a throttle valve: an auxiliary valve in said passage; a suction cylinder communicating with said passage; a piston in said suction cylinder; means operable by suction responsive movement of said piston for closing said auxiliary valve and for admitting scavenging gas to the mixture outlet passage beyond the valve in the direction of air flow; a primary spring continuously engaging said piston and biasing same toward a valve opening position; a secondary spring in said cylinder adapted to resist movement of said piston near the end of its valve closing movement for partially opening said valve when the suction in said cylinder is partially relieved, and means for longitudinally adjusting said secondary spring, said suction responsive movement of the piston normally being unopposed by said secondary spring.

9. In combination with the mixture outlet passage of a carbureter having a throttle valve: an auxiliary valve in said passage; a suction cylinder communicating with said passage; a piston in said suction cylinder; means operable by suction responsive movement of said piston for closing said auxiliary valve; a weak spring continuously engaging said piston and biasing same toward a valve opening position; a strong spring in said cylinder adapted to resist movement of said piston near the end of its valve closing movement for partially opening said valve when the suction in said cylinder is partially relieved, said suction responsive movement of the piston normally being unopposed by said strong spring, and means including a valve under control of said piston for admitting scavenging gas to said mixture outlet passage beyond the auxiliary valve in the direction of air flow when said auxiliary valve is fully closed.

10. In an engine provided with an intake manifold, and a carburetor having a mixture outlet passage and a throttle valve, the combination comprising an auxiliary valve in said passage, a suction responsive member operable by manifold depression to close said auxiliary valve, means adapted to open said auxiliary valve when the depression acting on said suction responsive means is less than normal idling depression, means normally unopposing the valve closing movement of said suction responsive member but resisting such movement near the end thereof to maintain the valve partially open at idling manifold depression, and means for admitting scavenging gas to said manifold at a point beyond the auxiliary valve in the direction of air flow when said auxiliary valve is closed.

11. In an engine provided with an intake manifold, and a carbureter having a mixture outlet passage and a throttle valve, the combination comprising an auxiliary valve in said passage, a suction responsive member operable by manifold depression to close said auxiliary valve, means adapted to open said auxiliary valve when the depression acting on said suction responsive means is less than normal idling depression, means normally unopposing the valve closing movement of said suction responsive member but resisting such movement near the end thereof to maintain the valve partially open at idling manifold depression, and means connected directly to said suction responsive member for admitting scavenging gas to said manifold at a point beyond the auxiliary valve in the direction of air flow when said auxiliary valve is closed.

12. In an engine provided with an intake manifold, and a carbureter having a mixture outlet passage and a throttle valve, the combination comprising an auxiliary valve in said passage, a suction responsive member operable by manifold depression to close said auxiliary valve, means adapted to open said auxiliary valve when the depression acting on said suction responsive means is less than normal idling depression, means normally unopposing the valve closing movement of said suction responsive member but resisting such movement near the end thereof to maintain the valve partially open at idling manifold depression, means for admitting scavenging gas to said manifold at a point beyond the auxiliary valve in the direction of air flow when said auxiliary valve is closed, and throttle controlled means for relieving the manifold suction applied to said member at open positions of the throttle.

13. In an engine provided with an intake manifold, and a carbureter having a mixture outlet passage and a throttle valve, the combination comprising an auxiliary valve in said passage, a suction responsive member operable by manifold depression to close said auxiliary valve, means maintaining said suction responsive member in constant communication with the manifold independently of throttle position, means adapted to open said auxiliary valve when the depression acting on said suction responsive means is less than normal idling depression, means normally unopposing the valve closing movement of said suction responsive member but resisting such movement near the end thereof to maintain the valve partially open at idling manifold depression, and means for admitting scavenging gas to said manifold at a point beyond the auxiliary valve in the direction of air flow when said auxiliary valve is closed.

ALBERT G. H. VANDERPOEL.

CERTIFICATE OF CORRECTION.

Patent No. 2,129,610.  September 6, 1938.

ALBERT G. H. VANDERPOEL.

It is hereby certified that error appears in the printed specification of the above numbered patent requiring correction as follows: Page 4, second column, line 68, claim 4, for the word "control" read outlet; and that the said Letters Patent should be read with this correction therein that the same may conform to the record of the case in the Patent Office.

Signed and sealed this 1st day of November, A. D. 1938.

Henry Van Arsdale (Seal)  Acting Commissioner of Patents.

is less than normal idling depression, means normally unopposing the valve closing movement of said suction responsive member but resisting such movement near the end thereof to maintain the valve partially open at idling manifold depression, means for admitting scavenging gas to said manifold at a point beyond the auxiliary valve in the direction of air flow when said auxiliary valve is closed, and throttle controlled means for relieving the manifold suction applied to said member at open positions of the throttle.

13. In an engine provided with an intake manifold, and a carbureter having a mixture outlet passage and a throttle valve, the combination comprising an auxiliary valve in said passage, a suction responsive member operable by manifold depression to close said auxiliary valve, means maintaining said suction responsive member in constant communication with the manifold independently of throttle position, means adapted to open said auxiliary valve when the depression acting on said suction responsive means is less than normal idling depression, means normally unopposing the valve closing movement of said suction responsive member but resisting such movement near the end thereof to maintain the valve partially open at idling manifold depression, and means for admitting scavenging gas to said manifold at a point beyond the auxiliary valve in the direction of air flow when said auxiliary valve is closed.

ALBERT G. H. VANDERPOEL.

CERTIFICATE OF CORRECTION.

Patent No. 2,129,610. September 6, 1938.

ALBERT G. H. VANDERPOEL.

It is hereby certified that error appears in the printed specification of the above numbered patent requiring correction as follows: Page 4, second column, line 68, claim 4, for the word "control" read outlet; and that the said Letters Patent should be read with this correction therein that the same may conform to the record of the case in the Patent Office.

Signed and sealed this 1st day of November, A. D. 1938.

Henry Van Arsdale (Seal) Acting Commissioner of Patents.